United States Patent [19]

Mickelson

[11] 3,980,552

[45] Sept. 14, 1976

[54] HYDRODESULFURIZATION OF RESIDUAL PETROLEUM OIL WITH A SULFIDED COBALT-MOLYBDENUM-ALUMINA CATALYST

[75] Inventor: Grant A. Mickelson, Yorba Linda, Calif.

[73] Assignee: Union Oil Company of California, Los Angeles, Calif.

[22] Filed: May 5, 1975

[21] Appl. No.: 574,538

[52] U.S. Cl. ............................................. 208/216
[51] Int. Cl.$^2$ ........................................ C10G 23/02
[58] Field of Search ...................................... 208/216

[56] References Cited
UNITED STATES PATENTS

| | | | |
|---|---|---|---|
| 3,686,095 | 8/1972 | Coons, Jr. et al. | 208/216 |
| 3,749,664 | 7/1973 | Mickelson | 208/216 |
| 3,755,150 | 8/1973 | Mickelson | 208/216 |
| 3,770,617 | 11/1973 | Riley et al. | 208/216 |
| 3,770,618 | 11/1973 | Adams et al. | 208/216 |
| 3,907,668 | 9/1975 | Christman et al. | 208/216 |

*Primary Examiner*—G. J. Crasanakis
*Attorney, Agent, or Firm*—Richard C. Hartman; Lannas S. Henderson; Dean Sandford

[57] ABSTRACT

Residual oils comprising asphaltenes, metal compounds, and refractory sulfur compounds are hydrodesulfurized by contact with a unique type of cobalt-molybdenum-alumina catalyst characterized by certain critical physical properties of surface area, pore volume, pore size distribution, and by a particle-form shape exhibiting a ratio of external surface area to volume of between about 70 and 160 reciprocal inches. The most critical characteristic of the catalyst, which appears to account mainly for its exceptionally high activity, stems from its method of manufacture. This method involves first mixing an alumina hydrogel with an ammonium molybdate solution, spray drying the resulting slurry to a water content of about 10–40 weight-percent, remulling the spray-dried composite with water, extruding the composite into extrudates of specific size ranges, calcining the extrudates, impregnating the calcined extrudates with an aqueous solution of a cobalt compound, and finally calcining the impregnated extrudates.

8 Claims, No Drawings

HYDRODESULFURIZATION OF RESIDUAL PETROLEUM OIL WITH A SULFIDED COBALT-MOLYBDENUM-ALUMINA CATALYST

BACKGROUND AND SUMMARY OF INVENTION

In the hydrodesulfurization of petroleum residua, catalyst cost factors constitute a major problem. These cost factors are an aggregate of catalyst raw material and manufacturing costs, and the activity and deactivation rates of the catalysts. The problem is further aggravated by the fact that to date it has not been found commercially feasible to regenerate deactivated residua desulfurization catalysts, due principally to the deposition thereon during processing of metals such as vanadium and nickel, which are universally present in residual feedstocks.

Balancing all of the foregoing factors, the most cost-effective type of catalyst yet discovered for residual oil desulfurization is composed of minor proportions of cobalt and molybdenum dispersed in an alumina support. It appears that the most inexpensive and widely used method for manufacturing such catalysts (disclosed for example in U.S. Pat. Nos. 3,509,044 and 3,674,680) involves simply comulling the alumina support, generally a spray-dried alumina hydrate, with an aqueous solution or solutions of cobalt and molybdenum compounds, extruding the mixture and calcining the extrudates. Though relatively inexpensive, this method generally produces catalysts of low intrinsic activity and/or high deactivation rates, such that very large quantities of catalyst are required for a given feed throughput and conversion, and the catalyst deactivation rate is often such that only short run lengths are obtainable before the catalyst must be discarded and replaced.

I have now discovered that by resorting to a slightly more expensive manufacturing method, a catalyst of such improved activity and activity maintenance is obtained as to render it overall more cost-effective than the above discussed prior art catalysts. In brief summary this method involves the following steps:

1. slurrying an alumina hydrogel, with or without a minor proportion of silica hydrogel, in an aqueous solution of ammonium molybdate;
2. spray drying the resulting slurry to a water content of about 10–40 weight-percent;
3. mulling the spray-dried composite with water and sufficient of a peptizing acid to give a pH between about 3.6 and 6.0;
4. extruding the mulled composite into extrudates having a maximum overall diameter between about 0.03 and 0.06 inches, and a length between about 0.1 and 0.25 inches;
5. calcining the resulting extrudates at a temperature between about 900° and 1400°F;
6. impregnating the calcined extrudates with an aqueous solution of a cobalt compound; and
7. calcining the impregnated extrudates at a temperature between about 900° and 1400°F.

Catalysts thus prepared have been found to display in general about 30 to 70 percent higher activity than catalysts of the same nominal composition prepared by the above discussed prior art method. While I am unable to account with certainty for this improved activity, it is hypothesized that my method permits a more complete and selective chemical and/or physicochemical combination of the molybdenum component with the alumina base, rather than with the cobalt component. The above described prior art method inherently results in an uncontrolled and indiscriminate interaction of all components with each other during the single calcination step. Further, by suitably controlling the severity of calcination in step (5), I am able to obtain a product of high surface area such that upon subsequent impregnation with the cobalt solution in step (6) a maximum cobalt surface area is obtained. The final product is also found to display an optimum combination of the critical physical characteristics of total surface area, pore volume, and pore size distribution for the desulfurization of residua feedstocks. The catalysts may be utilized to obtain any desired degree, up to about 95 percent, of desulfurization of most conventional residua feedstocks. Run lengths in the order of about 6 months to 1 year are normally obtainable.

DETAILED DESCRIPTION

Preparation of Catalysts

In the following description, it will be understood that sufficient of the various raw materials and reagents should be utilized to provide a finished catalyst falling within the following composition ranges:

|                            | Wt.% - Dry Basis |                  |
|----------------------------|------------------|------------------|
|                            | Broad Range      | Preferred Range  |
| $MoO_3$                    | 5–20             | 10–15            |
| $CoO$                      | 1–7              | 2–5              |
| $SiO_2$ (Optional)         | 1–5              | 1.5–3            |
| $Al_2O_3$                  | Balance          | Balance          |

The alumina hydrogel utilized in step (1) of the process is preferably prepared freshly in conventional manner by precipitating from aqueous solution stoichiometrically equal quantities of aluminum sulfate and sodium aluminate. Precipitation is brought about by adding to the solution sufficient of a base such as ammonia or sodium hydroxide to bring the pH to about 9–10. For the preferred compositions containing silica gel, it is preferred to incorporate a washed silica hydrogel into the aluminum sulfate-sodium aluminate solution prior to precipitation of the alumina hydrogel. After precipitation is complete, the resulting aqueous slurry is then filtered and washed exhaustively in conventional manner to remove essentially all sodium and sulfate ions. The final gelatinous filter cake generally contains between about 10–15 weight-percent solids.

The filter cake prepared as described above is then reslurried in sufficient of an aqueous ammonium molybdate solution to provide a spray-dryable mixture, normally containing between about 6–12 weight-percent of total solids. Any suitable water-soluble ammonium molybdate salt may be utilized such as ammonium dimolybdate, or preferably ammonium heptamolybdate. Spray-drying is carried out under conventional conditions well known in the art to obtain a powdered product in which the alumina is in the form of a hydrate such as boehmite. The spray-dried material normally contains about 10–40 weight-percent of water.

The spray-dried alumina-molybdena powder is then mixed with sufficient water, normally about an equal weight proportion, to provide an extrudable mixture. The pH of the mixture is then adjusted to about 3.6–6.0 with an added acid such as acetic acid or nitric acid, the latter being preferred. The mixture is then mulled for a suitable period of time, normally about 1–5 hours, to obtain a homogeneous extrudable mixture. The mulled mixture is then extruded in conventional manner, dried, and calcined at temperatures between about 900° and 1400°F, preferably 1100°–1300°F, for about 0.5–3 hours. This initial calcination should be suitably controlled so as to give the desired surface area and pore size distribution in the final catalyst.

For the hydrodesulfurization of residua feedstocks, pore size distribution is very important. Catalysts which contain a large volume of macro-pores with diameters above about 100 angstroms, are found to deactivate very rapidly, apparently because the large asphaltene molecules of the feedstock can enter the large pores with resultant formation of coke. It is therefore desirable to concentrate a major proportion of the active catalyst surface area and pore volume in pores having a diameter between about 40 and 100 angstroms, preferably 50–80 angstroms, which do not provide access for the large asphaltene molecules.

For catalysts having a total pore volume of between about 0.3 and 0.8 ml/g and a total surface area between about 150 and 350 m²/g, it is critical for adequate catalyst life to limit the volume of pores having a diameter above about 100 angstroms to between about 0.01 and 0.1 ml/g. This objective can readily be achieved by controlling the severity of the mulling operation in step (3) and the acidity of the mixture being mulled. High acidity tends to reduce pore size, and extensive mulling tends to reduce the volume of pores of diameter above 100 A. Mild conditions of calcination in step (5) (such as 900°F for 1 hour) tend to give catalysts with an excessive volume of very small pores, whereas more severe conditions (such as 1400°F for two hours) bring about an excessive enlargement of the pores. At preferred calcination temperatures in the 1000°–1300°F range a product having an average pore diameter in the 40–100 angstrom range is readily obtainable. The calcination conditions should not however be so severe as to reduce the total surface area to less than about 150, and preferably not less than about 200, m²/g.

The cobalt impregnation step is conventional in nature and hence need not be described in detail. Soaking or immersion techniques may be utilized, but spray impregnation is preferred. Suitable water-soluble cobalt compounds include cobalt nitrate, cobalt acetate, cobalt sulfate and the like, as well as any of the various water soluble ammino-complexes of cobalt salts. Cobalt nitrate is preferred. Following impregnation, the catalyst is dried in conventional manner at e.g. 200°–300°F and calcined at 900°–1400°F, preferably 1100°–1300°F, for about 0.5–4 hours.

The size and shape of the catalyst extrudates prepared as described above is another important consideration. In the art of hydrodesulfurizing petroleum residua it is known that a more effective utilization of the catalyst is obtained by maximizing the exterior surface area of the catalyst particles, relative to their volume. The very heavy sulfur compounds in residual oils diffuse very slowly into the pores of the catalyst particles, and hence the interior portions thereof tend to be relatively ineffective, most of the desired conversion of sulfur compounds taking place near the external surface areas thereof. Many attempts have been made to overcome this difficulty, including the use of finely powdered catalysts in the form of a slurry, and even the use of homogeneously dissolved or colloidal catalysts. To date however none of such processes have proven to be practical, mainly because of difficulties involved in separating the treated oil from the catalyst. Present day technology dictates the use of macro-particles of catalyst arranged in a fixed bed, through which the preheated oil plus hydrogen is passed, but it is in such processes that the above noted diffusion problems are encountered.

One method for alleviating such diffusion problems resides in minimizing the size of the catalyst particles. However this approach is subject to limitations; catalyst extrudates below about 1/32-inch in diameter lead to excessive pressure drops through the reactor due to the reduced interstitial void space in the catalyst bed. Excessive breakage and production of fines may also occur. U.S. Pat. No. 3,674,680 to Hoekstra et al represents one attempt to overcome these difficulties. In this patent, small extrudate catalyst particles are utilized wherein all points within any particle are less than about 0.015 inch from a surface of the particle. Pressure drop problems, and to some extent mechanical strength problems, normally associated with use of such small particles are alleviated by forming the extrudates in various non-cylindrical shapes, e.g. shapes having the cross sectional configuration of a cross or clover-leaf, thereby providing more interstitial void space in the catalyst bed. The special shapes described also provide a substantial increase in the ratio of exterior surface area to volume, thereby increasing the efficiency of utilization of the catalyst. Any of such special shapes may be utilized herein.

To summarize, whether cylindrical or non-cylindrical catalyst shapes are chosen, it is found that the following combination of catalyst dimensions is optimum from the standpoint of the best compromise between catalyst activity, deactivation rates, pressure drops and catalyst breakage:

| | Catalyst Dimensions, Inches | |
|---|---|---|
| | Broad Range | Preferred Range |
| Length | 0.1 – 0.25 | 0.12 – 0.2 |
| Diameter | 0.03 – 0.06 | 0.04 – 0.05 |
| Ratio, External Surface Area/Vol, in⁻¹ | 70 – 160 | 90 – 145 |

An especially preferred catalyst shape for use herein is one having a "trilobal" or three-leaf clover type of cross section, such as that illustrated for example in FIG. 5-A of U.S. Pat. No. 3,857,780. For purposes of the present invention such a cross-sectional shape may be defined as a symmetrical trilobe in which the perimeter of each lobe is defined by a 180°–270° arc of a circle having a diameter between about 0.02 and 0.03 inches. The 180° arc trilobe is optimum from the standpoint of mechanical strength, but packed beds thereof are deficient in void space, thus presenting pressure drop problems. The 270° arc trilobe is optimum from the pressure drop standpoint, but is somewhat fragile in that the lobes tend to break away from each other. An optimum combination of properties appears to be exhibited by trilobe extrudates wherein each lobe is defined by a 210°–250° arc.

USE OF CATALYSTS

The above catalysts may be effectively utilized for the desulfurization of substantially any topped crude oil, vacuum residua, atmospheric residua, or mixtures thereof with each other or with other petroleum products. The general characteristics of such feedstocks are as follows:

| Feedstock Properties | |
|---|---|
| Sulfur, wt.% | 1–7 |
| Nitrogen, wt.% | 0–2 |
| Metals, ppm | 10–500 |
| Vanadium, ppm | 10–400 |
| Asphaltenes, wt.% | 1–20 |
| Percent Boiling above 900°F | 20–100 |
| Gravity, °API | −5–30 |

The operative hydrodesulfurization process conditions fall within the following ranges:

| Process Conditions | | |
|---|---|---|
| | Broad Range | Preferred Range |
| Temp. °F | 650–850 | 700–825 |
| Pressure, psig | 1000–3000 | 1500–2500 |
| $H_2$/oil Ratios, MSCF/B | 0.5–8 | 2–5 |
| LHSV | 0.1–2 | 0.2–1 |

Those skilled in the art will readily understand that temperatures and space velocities can be suitably adjusted to provide any desired degree of desulfurization, up to about 95%. It is desirable however to avoid combinations of high space velocities with high temperatures, which combinations generally result in excessive cracking, coke formation and rapid catalyst deactivation. In general, a sufficiently low space velocity should be used to permit the desired degree of desulfurization at a sufficiently low temperature to avoid production of more than about 10–15 volume percent of light ends boiling below the initial boiling point of the feedstock. Operating in this manner, run lengths of at least about 90 days are normally obtainable, even at desulfurization levels above 75 percent.

The following examples are cited as illustrative of the invention but are not to be construed as limiting in scope:

EXAMPLE 1

A catalyst of this invention containing by weight, 4% CoO, 12% $MoO_3$, 2% $SiO_2$ and the balance alumina, was prepared as follows:

The calculated proportions of a freshly prepared, washed alumina hydrogel, a freshly prepared, washed silica hydrogel and ammonium heptamolybdate were slurried together in sufficient water to provide a spray-dryable mixture containing about 8 wt.% total solids. The resulting slurry was then spray-dried under conventional conditions to obtain a powder containing about 30 wt.% $H_2O$. The spray-dried powder was then mulled for about 4 hours with about an equal weight of water and sufficient added nitric acid to provide a pH of 4.8. The mulled mixture was then extruded through a die to provide 1/16-inch diameter extrudates, which were then dried at 250°F and calcined in air for one hour at 1200°F. The calcined extrudates were then spray-impregnated with sufficient of a 20 wt.% solution of cobalt nitrate hexahydrate to provide the calculated cobalt content. After aging for 2 hours the impregnated extrudates were then dried at 250°F and calcined for 1 hour at 1200°F. The finished catalyst had a total surface area of 275 $m^2$/g, a total pore volume of 0.46 ml/g, an average pore diameter of 70 angstroms, about 0.03 ml/g of macropores having a diameter greater than 100 A, and had an external surface area/volume ratio of about 75 reciprocal inches.

The above catalyst was then activity tested for desulfurization of a Kuwait atmospheric resid having a 50 percent boiling point of 942°F, a gravity of 16.7 °API, a sulfur content of 3.7 wt.%, an asphaltene content of 5.6 wt.%, a vanadium content of 33 ppm and a nickel content of 13 ppm. The test was carried out over a five-day period at a hydrogen partial pressure of 800 psig, liquid hourly space velocity of 0.5, and a hydrogen/oil ratio of 4000 SCF/B. The temperature was adjusted (in the neighborhood of about 670°F) to achieve the target 75% desulfurization. Based on second order kinetics, the activity of this catalyst was found to be 80, relative to a laboratory standard catalyst having an activity of 100.

EXAMPLE 2

A catalyst of essentially the same dimensions, chemical composition, and physical characteristics as those of the catalyst of Example 1 was prepared, but by a prior art method as follows:

The calculated proportions of silica-hydrogel and a spray-dried alumina hydrate, ammonium heptamolybdate and cobalt nitrate were mulled together with added nitric acid and approximately an equal weight of water, sufficient to provide an extrudable mixture. After mulling at a pH of 4.8 as described in Example 1, the mixture was then extruded to provide 1/16-inch extrudates, then dried and calcined at 1200°F as described in Example 1.

This catalyst when activity tested as described in Example 1 showed an activity of only 50 as compared to the laboratory standard. Thus, the catalyst of Example 1 was about 60 percent more active than the catalyst of this Example.

EXAMPLE 3

Another catalyst of the same composition as that of Example 1 was prepared by the same procedure described in Example 1, except that the mulled alumina-silica-molybdena mixture was extruded in the form of a symmetrical trilobe, the cross sectional periphery of each lobe being defined by about a 240° arc of a circle having a diameter of about 0.026 inches. The ratio of external surface area/volume of the resulting extrudates was about 120 reciprocal inches.

The relative activity of this catalyst was found to be 146, when tested as described in Example 1. This is about 82 percent higher than the activity of the catalyst of Example 1, thus demonstrating the effect of the higher ratio of external surface area/volume.

EXAMPLE 4

Another catalyst of this invention was prepared exactly as described in Example 1, except that it was extruded in the form of 1/32-inch extrudates. In this form, the calculated ratio of external surface area/volume was 140 reciprocal inches.

Upon testing this catalyst as described in Example 1, the relative activity was found to be about 165, thus again demonstrating the effect of higher ratios of external surface area/volume. Although this catalyst displayed a higher activity than any in the preceding examples, the following example will show that in packed beds it presents pressure drop problems.

EXAMPLE 5

The catalysts of Examples 1, 3 and 4 were subjected, in compacted isometric beds, to a standard pressure drop test, involving measurement of pressure drop through the beds under standard gas flow rate conditions. The results were as follows:

| Pressure Drop Comparison | | | |
|---|---|---|---|
| Catalyst | Ex. 1 | Ex. 3 | Ex. 4 |
| Shape of Extrudate | Cylinder | Trilobe | Cylinder |
| Diameter, in. | 0.059 | 0.045$^{(a)}$ | 0.032 |
| Av. Length, in. | 0.177 | 0.167 | 0.122 |
| Relative Pressure Drop | 1.00 | 0.96 | 2.32 |

$^{(a)}$Measured diametrically across two lobes-maximum diameter.

It will be seen that the catalyst of Example 3 showed essentially the same pressure drop characteristics as the 1/16-inch extrudate of Example 1, while displaying a substantially higher activity as a result of its higher ratio of external surface area/volume. To take advantage of the higher activity of the catalyst of Example 4, shallower beds would be required with the attendant added expense involved in larger diameter reactors. Nevertheless, each of the catalysts of Examples 1, 3 and 4 present definite activity advantages over that of Example 2, stemming from the method of preparation in which the cobalt is impregnated upon a precalcined composite of molybdena-alumina.

The following claims and their obvious equivalents are believed to define the true scope of the invention.

I claim:

1. A process for the hydrodesulfurization of a residual petroleum feedstock containing 1–20 weight-percent asphaltenes and 10–500 ppm metals, which comprises contacting said feedstock in admixture with 500–8,000 SCF/B of hydrogen at a temperature of 650°–850°F and a pressure of 1000–3000 psig, with a catalyst consisting essentially of a sulfided composite of 1–7 weight-percent CoO and 5–20 weight-percent MoO$_3$ supported on a carrier consisting essentially of activated alumina, said catalyst being further characterized by:
   a. a total surface area between 150 and 350 m$^2$/g;
   b. a pore volume between 0.3 and 0.8 ml/g;
   c. an average pore diameter between 40 and 100 A;
   d. a pore volume in pores above 100 A diameter of between 0.01 and 0.1 ml/g; and
   e. a particle-form shape having a ratio of external surface area to volume of between 70 and 160 reciprocal inches;
said catalyst having been prepared by the steps of:
   1. slurrying an alumina hydrogel in an aqueous solution of ammonium molybdate;
   2. spray drying the resulting slurry to a water content of about 10–40 weight-percent;
   3. mulling the spray-dried composite with water and sufficient acid to give a pH between 3.6 and 6.0;
   4. extruding the mulled composite into extrudates having a maximum overall diameter between 0.03 and 0.06 inches and a length between 0.1 and 0.25 inches;
   5. calcining the resulting extrudates at a temperature between 900° and 1400°F;
   6. impregnating the calcined extrudates with an aqueous solution of a thermally decomposable cobalt compound; and
   7. calcining the impregnated extrudates at a temperature between 900° and 1400°F.

2. A process as defined in claim 1 wherein said catalyst also comprises between about 1 and 5 percent by weight of silica gel.

3. A process as defined in claim 1 wherein the cross section of the extrudates formed in step (4) is in the shape of a trilobe wherein each lobe is defined by a 180°–270° arc of a circle having a diameter between about 0.02 and 0.03 inches.

4. A process as defined in claim 3 wherein said catalyst also comprises between about 1 and 5 percent by weight of silica gel.

5. A process as defined in claim 4 wherein said extrudates have a ratio of external surface area to volume of between 100 and 150 reciprocal inches.

6. A process as defined in claim 1 wherein said extrudates have a maximum overall diameter between 0.05 and 0.06 inches, a length between 0.12 and 0.2 inches and a ratio of external surface area to volume of between 100 and 150 reciprocal inches.

7. A process as defined in claim 6 wherein catalyst also comprises between about 1 and 5 percent by weight of silica gel.

8. A process as defined in claim 7 wherein the cross section of the extrudates formed in step (4) is in the shape of a trilobe wherein each lobe is defined by a 180°–270° arc of a circle having a diameter between about 0.02 and 0.03 inches.

* * * * *